(12) United States Patent
Kamihira et al.

(10) Patent No.: US 6,941,176 B2
(45) Date of Patent: Sep. 6, 2005

(54) METHOD AND APPARATUS FOR CHANGING AND CONTROLLING CHARACTERISTICS OF DEVICE

(75) Inventors: Ichikai Kamihira, Shizuoka (JP); Hirotaka Kaji, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 707 days.

(21) Appl. No.: 09/840,679

(22) Filed: Apr. 23, 2001

(65) Prior Publication Data

US 2002/0045958 A1 Apr. 18, 2002

(30) Foreign Application Priority Data

Apr. 24, 2000 (JP) ........................................ 2000-123176

(51) Int. Cl.⁷ .............................................. G06F 15/46
(52) U.S. Cl. ............................ 700/28; 700/32; 701/58; 701/68; 701/70; 701/99
(58) Field of Search ............................... 700/28, 32, 33, 700/34; 701/42, 58, 60, 68, 70, 85, 99, 103, 110

(56) References Cited

U.S. PATENT DOCUMENTS

| | | | |
|---|---|---|---|
| 5,153,807 A | 10/1992 | Saito et al. | |
| 5,159,562 A | 10/1992 | Putman et al. | |
| 5,268,835 A | 12/1993 | Miyagaki et al. | |
| 5,285,378 A | 2/1994 | Matsumoto | |
| 5,347,447 A | 9/1994 | Kiji et al. | |
| 5,465,204 A | 11/1995 | Sekine et al. | |
| 5,634,039 A | 5/1997 | Simon et al. | |
| 5,826,249 A | 10/1998 | Skeirik | |
| 5,996,518 A | * 12/1999 | Tomita .................. | 112/470.01 |
| 6,021,369 A | 2/2000 | Kamihira et al. | |
| 6,032,139 A | 2/2000 | Yamaguchi et al. | |
| 6,223,103 B1 | * 4/2001 | Patil .............................. | 701/1 |

FOREIGN PATENT DOCUMENTS

| | | |
|---|---|---|
| EP | 535 340 A2 | 4/1993 |
| EP | 0 715 253 A2 | 6/1996 |

OTHER PUBLICATIONS

Q.H. Wu, et al., On–line evaluation of auto–tuning optimal PID controller on micromachine system, Department of Electrical and Electronic Engineering, The Queen's University of Belfast, Belfast BT9 5AH, U.K., Jul. 3, 1990, pp 751–769.

P.K. Dash, et al., Fuzzy and Neural Controllers for Dynamic Systems: an Overview, Department of Electrical Engineering national University of Singapore, 1997, pp 810–816.

* cited by examiner

*Primary Examiner*—Emanuel Todd Voeltz
(74) *Attorney, Agent, or Firm*—Knobbe, Martens, Olson & Bear LLP

(57) ABSTRACT

Real time customization of characteristics of a control unit is conducted, and a control unit can become adaptive to an individual user. The input-output relationship of the control module is regulated by pre-selected control parameters. A method includes the steps of: (a) calculating values of the control parameters; (b) operating the machine using the values of the control parameters; (c) indicating to the user the values of the control parameters in sensorially recognizable form; (d) indicating to the user an intuitively recognizable symbol generalizing the values of the control parameters; (e) selecting or modifying the values of the control parameters by the user using the information indicated in steps (c) and (d) based on the user's evaluation of the performance of the machine; and (f) repeating steps (a) through (e) while operating the machine.

18 Claims, 14 Drawing Sheets

| SP₁ | SP₂ | DR | AG |

*Figure 7*

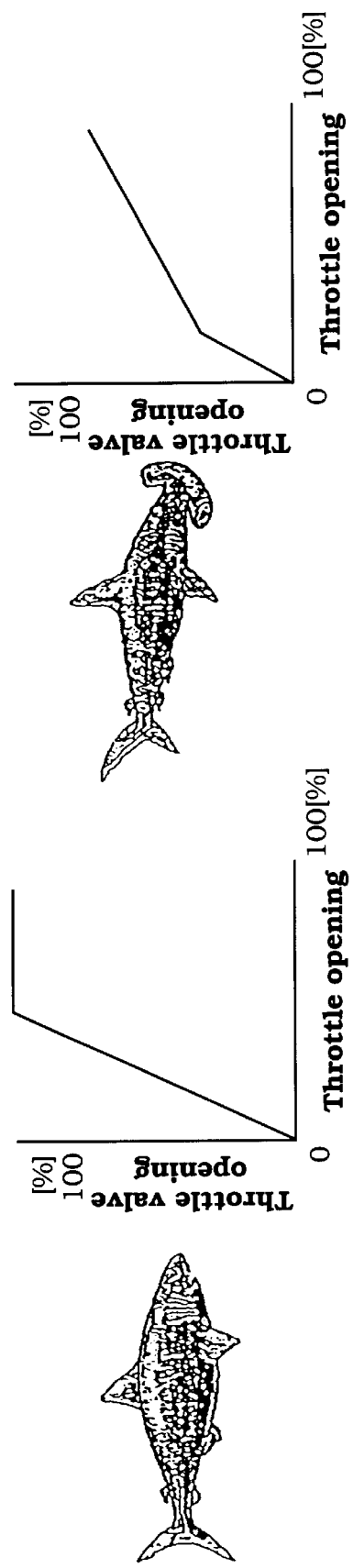
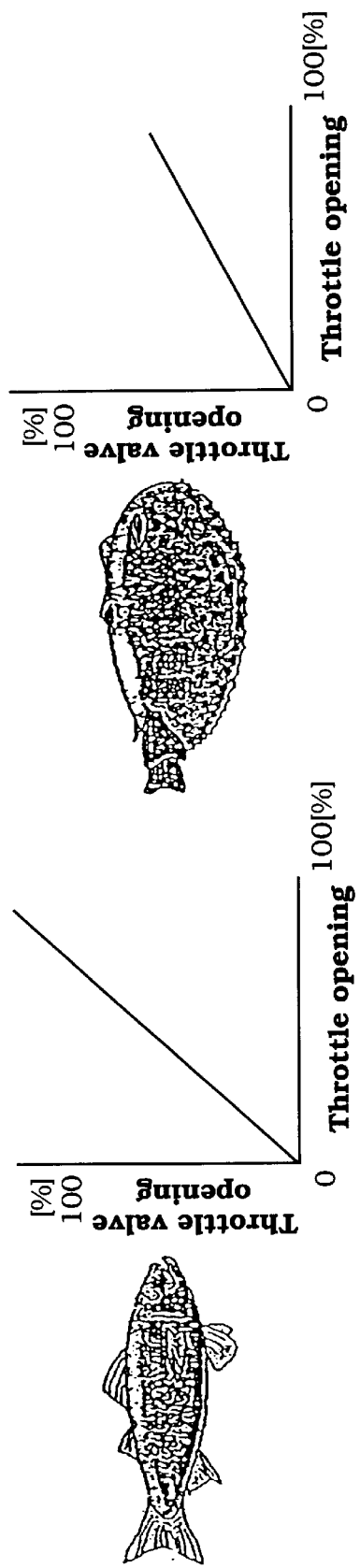
Figure 10a  Figure 10b
Figure 10c  Figure 10d

METHOD AND APPARATUS FOR CHANGING AND CONTROLLING CHARACTERISTICS OF DEVICE

BACKGROUND OF THE INVENTION

1. Field of the Invention

This invention relates to a method and apparatus for changing and controlling characteristics of a device.

2. Description of Related Art

Conventionally, characteristics of a base control module for controlling a machine (namely, parameter values for determining the input-output relationship of the base control module) were pre-determined when being designed or were adjusted before its shipment based on presumed preferences of target users. However, because users' preferences, skills, and environments in which the machine is used, vary, and it is impossible to design a control unit which satisfies all users with regard to all aspects.

One approach to provide a control unit adaptive to a user is customization of characteristics of the control unit in consideration of the user's preferences, skills, and environments in which the user expects to use the machine. However, customization of the control unit is difficult because numerous settings are available and fine tuning is required for each setting. Even for professional or skilled persons, customization is difficult, and in many cases, they need analytical devices which analyze and evaluate the results of the customization. Thus, laymen who neither have professional knowledge or skills nor have analytical devices cannot customize a control unit even if they know physical processes of customizing the control unit. Feelings of the user are insufficient for customizing the characteristics of the control unit.

Another approach is an adaptive approach which changes characteristics of a control unit in accordance with a user's operation and environments in which a machine is used, so that the control unit can adapt to the user's operation and environments. See U.S. Pat. No. 6,021,369, issued Feb. 1, 2000, and U.S. Pat. No. 6,032,139, issued Feb. 29, 2000, for example. However, this adaptation process takes time, and may or may not reach optimal characteristics.

SUMMARY OF THE INVENTION

The present invention provides a method or an apparatus for real time customization of characteristics of a control unit, which allow for easy and quick but sophisticated customization on a real-time basis. The control unit can become adaptive to an individual user. One aspect of the present invention is a method for controlling a machine operated by a user using a control module, the input-output relationship of which control module is regulated by pre-selected control parameters. In an embodiment, the method comprises the steps of: (a) calculating values of the control parameters; (b) operating the machine using the values of the control parameters; (c) indicating to the user the values of the control parameters in sensorially recognizable form; (d) indicating to the user an intuitively recognizable symbol generalizing the values of the control parameters; (e) selecting or modifying the values of the control parameters by the user using the information indicated in steps (c) and (d) based on the user's evaluation of the performance of the machine; and (f) repeating steps (a) through (e) while operating the machine. In the present invention, customization includes optimization.

According to the above embodiment of the present invention, the user can sensorially link the control parameters and the machine operation by observing the displayed parameter information while sensing or experiencing the performance or behavior of the machine. Conventionally, the values of the control parameters were preset and were not shown to a user. Further, in this embodiment, the user can learn about the control parameters because the parameter information is displayed not only in the form of intuitively recognizable symbols which represent general or overall characteristics of the values of the control parameters, but also in sensorially recognizable form which represents specific characteristics of the individual values of the control parameters. The sensorially recognizable form of information can facilitate the user's learning about the relationship between the performance of the machine and the values of the control parameters. This embodiment allows for easy and quick but sophisticated customization on a real-time basis. Accordingly, the control unit can become adaptive to an individual user.

In the above, in an embodiment, the step of calculating values of the control parameters can be conducted using evolutionary computing techniques. Using evolutionary computing techniques, multiple individuals coding for the control parameters are created under predetermined rules. The user can select an adaptive individual or individuals based on the user's evaluation on of the performance of the machine. That is, the user's evaluation is used as a feedback signal.

In the above, if a user understands and learns the relationship between the intuitively recognizable symbol for overall characteristics and the sensorially recognizable indications for specific characteristics and then between the sensorially recognizable indications for specific characteristics and the performance of the machine, it can be presumed that the user masters manipulation techniques of the sensorially recognizable indications for specific characteristics, and thus the intuitively recognizable symbol for overall characteristics can be eliminated.

In another aspect, the present invention can apply to an apparatus for controlling a machine operated by a user. In an embodiment, the apparatus comprises: (a) a control module for controlling performance of the machine, the input-output relationship of said control module being regulated by pre-selected control parameters; (b) a parameter module for calculating values of the control parameters; (c) an indicator for indicating to the user (i) the values of the control parameters in sensorially recognizable form and (ii) an intuitively recognizable symbol generalizing the values of the control parameters; and (d) an input device for selecting or modifying the values of the control parameters by the user using the information indicated in the indicator.

In the present invention, a machine to be controlled includes any machine which can be controlled electronically using a control module and which a user can recognize performance or output of the machine. The input-output relationship of the control module is regulated by control parameters. Conventional control modules may have preset control parameters, but one of ordinary skill in the art can readily configure the control parameters to be changeable by configuring a parameter module which outputs calculated control parameters when receiving input signals. The number of control parameters is not limited. Preferably, at least two parameters are used for sophisticated control. The control module can be provided with the machine or separately from the machine. The control module and the machine can be linked via the Internet. The machine includes an engine or a motor for a vehicle or a robot, an actuator for valves, and the like. The machine further includes a control module or unit for controlling another control module or unit, and a simulation machine for simulating another machine. When using a simulation machine, a control unit can be configured to be adaptive to a user on a real-time basis by applying the present invention. The characteristics of the control unit can then be adapted to a machine.

If the characteristics are used as control parameters for the control unit, the characteristics can easily be transferred to a control unit of the machine. The control parameters can be stored in a memory such as floppy disks or CD and then transferred to the machine, or the parameters can be transferred via the Internet. The above features can be demonstrated between machines or between users.

Customization or customization of a control module adaptive to a user is described in U.S. patent application Ser. No. 09/517,392, filed Mar. 2, 2000, and U.S. patent application Ser. No. 09/535,151, filed Mar. 24, 2000. The entire disclosure of these applications is incorporated herein by reference.

For purposes of summarizing the invention and the advantages achieved over the prior art, certain objects and advantages of the invention have been described above. Of course, it is to be understood that not necessarily all such objects or advantages may be achieved in accordance with any particular embodiment of the invention. Thus, for example, those skilled in the art will recognize that the invention may be embodied or carried out in a manner that achieves or customizes one advantage or group of advantages as taught herein without necessarily achieving other objects or advantages as may be taught or suggested herein.

Further aspects, features and advantages of this invention will become apparent from the detailed description of the preferred embodiments which follow.

BRIEF DESCRIPTION OF THE DRAWINGS

These and other features of this invention will now be described with reference to the drawings of preferred embodiments which are intended to illustrate and not to limit the invention.

FIG. 7 is a diagram showing coding of the control parameters of the electronic throttle control module.

FIGS. 10a, 10b, 10c, and 10d are schematic views showing exemplary correspondences between static characteristics and fish patterns.

DETAILED DESCRIPTION OF THE PREFERRED EMBODIMENTS OF THE INVENTION

General Structures of Customization System

Figure 1A:
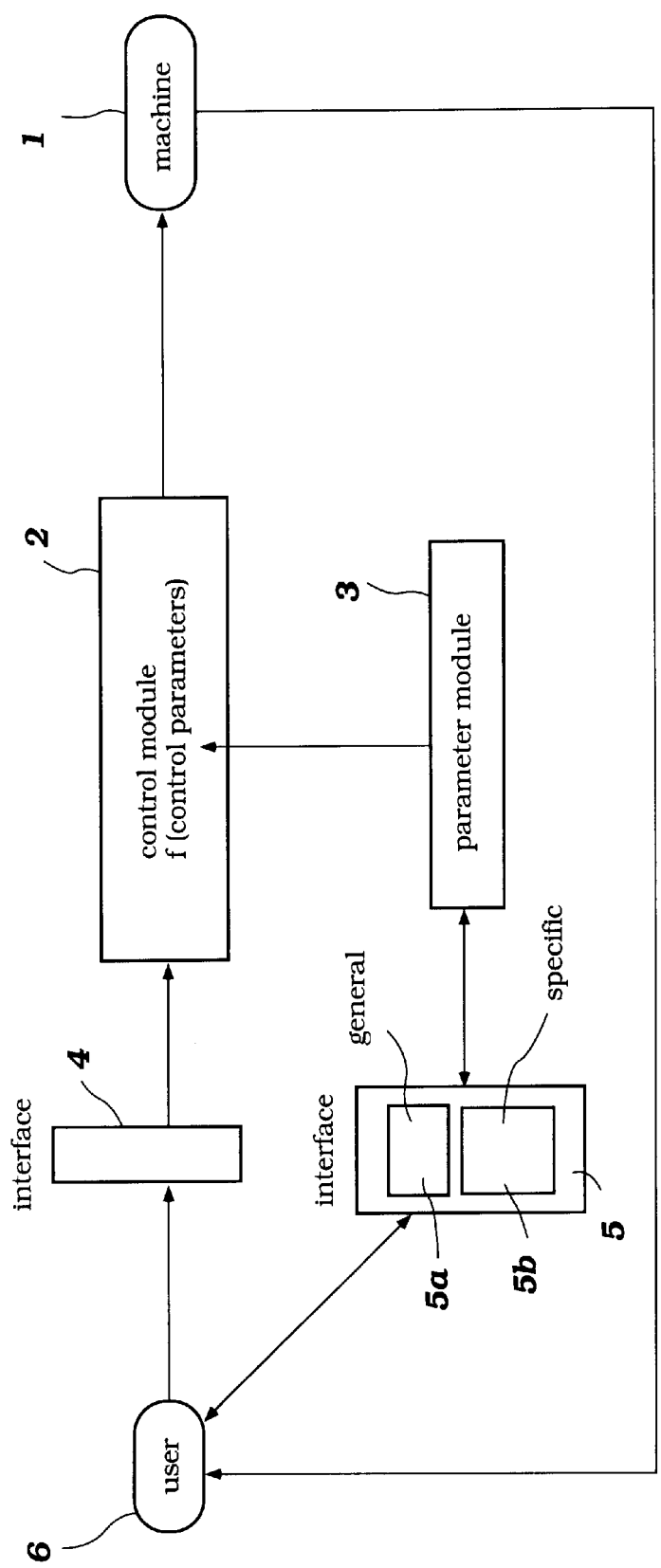
FIG. 1a is a schematic view showing an embodiment of a basic structure of the customization system according to the present invention.

FIG. 1a is a schematic view showing an embodiment of a basic structure of the customization system according to the present invention. A machine 1 is manipulated by a user 6 using a control module 2 via an interface 4. Performance of the machine 1 is controlled essentially by the control module 2 having an input-output relationship regulated by control parameters. Initial values of the control parameters can be pre-selected, and the machine 1 is activated with the initial values. The performance of the machine 1 is evaluated by the user 6. This feedback loop (the user 6→the interface 4→the control module 2→the machine 1→the user 6) is found in conventional operation. When initiating a real-time customization process, values of the control parameters are calculated and modified on a real-time basis by a parameter module 3 within predetermined ranges under predetermined coding rules. The calculated values of the control parameters are displayed to the user 6 by an interface 5 in the form of an intuitively recognizable symbol 5a which can be pre-selected to represent overall characteristics of the values of the control parameters and in sensorially recognizable form 5b which can be pre-selected to represent specific characteristics of the respective values of the control parameters. The calculated values of the control parameters are inputted to the control module 2 so that the input-output relationship of the control module 2 changes, resulting in changes in the performance of the machine 1. The user 6 will be sensorially aware of the changes. The user 6 then compares the sensorial changes of the performance and the two types of indications displayed on the display 5, so that the user 6 can understand the relationship therebetween. The intuitively recognizable symbol 5a is helpful in quick understanding of the currently used overall characteristics of the values of the control parameters. The user 6 simultaneously observes the sensorially recognizable indications 5b so that the user 6 can understand and learn specific characteristics of the control parameters which are the constituent elements of the overall characteristics. The sensorially recognizable indications 5b is helpful in developing the skills to manipulate the control parameters. If the user 6 is satisfied with the current performance of the machine 1, the user 6 can select the current values of the control parameters by inputting signals through the interface 5. If the user 6 is not satisfied with the current performance of the machine 1, the user 6 can modify the current values of the control parameters by inputting signals through the interface 5, so that the parameter module 3 modifies the values under the predetermined rules and displays the modified values to the user 6 via the interface 5. This second loop (the machine 1→ the user 6↔ the interface 5↔ the parameter module 3→ the control module 2→ the machine 1) allows the user 6 to customize the control module in real time. This basic structure can be adopted to various machine control methods and devices.

Figure 1B:
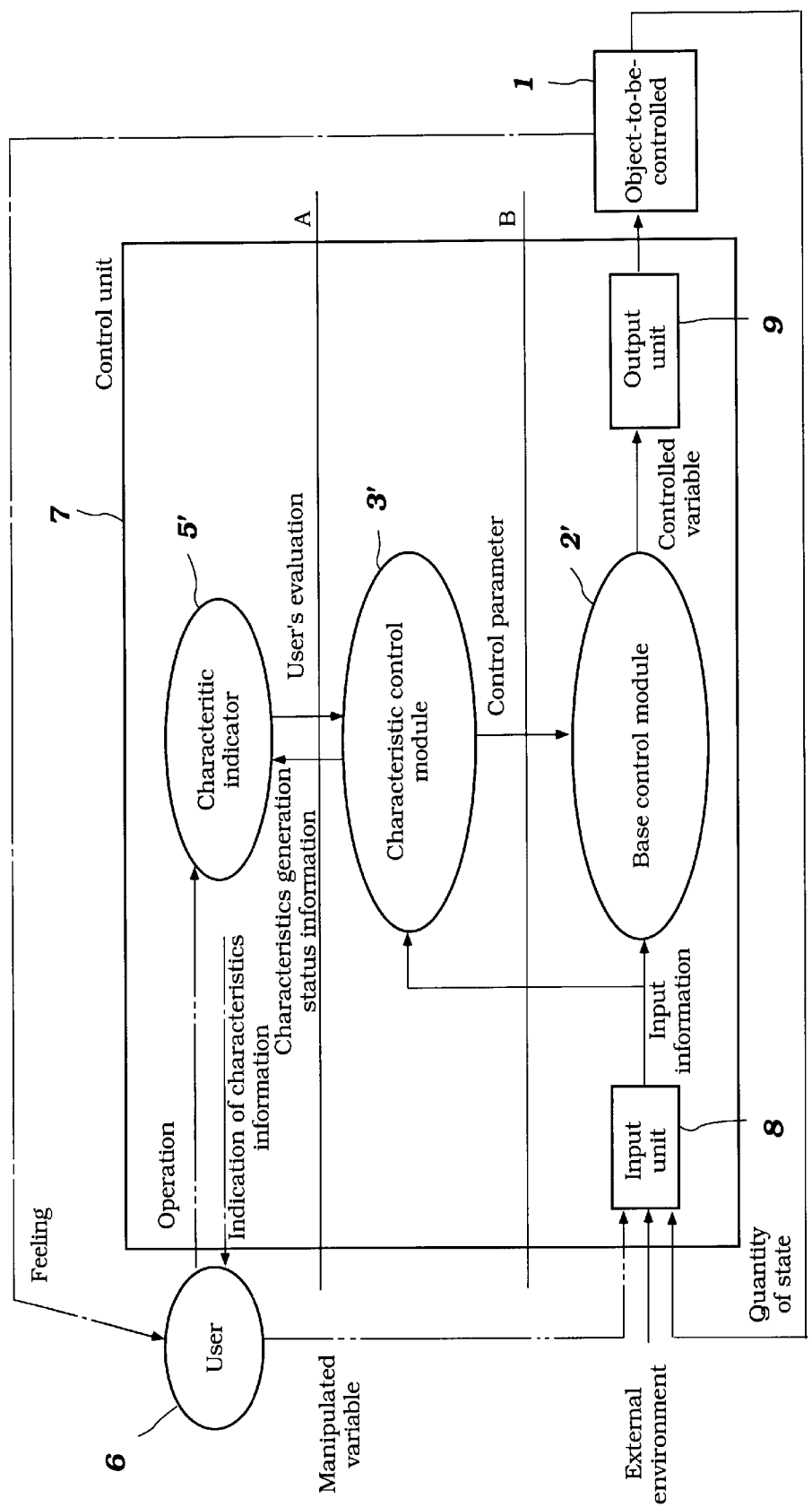
FIG. 1b is a schematic view showing an embodiment of a general structure of the customization system according to the present invention.

FIG. 1b is a schematic view showing another embodiment of a general structure of the customization system according to the present invention. This figure shows an example of signals which can be used for controlling a machine. These signals are not essential in other embodiments. A control unit 7 (which comprises a control module) comprises: (a) a base control module 2' which controls an object-to-be-controlled 1 via an output unit 9 by outputting a controlled variable based on input information received from an input unit 8 (which information includes a manipulated variable or control input from the user 6, information from the external environment, and the quantity of state indicative of the performance of the object 1); (b) a characteristic control module 3' (parameter module) which generates characteristic information for the base control module 2' (control parameters) in accordance with pre-determined evaluation standards; and (c) a characteristic indicator 5' which indicates the characteristic information generated by the characteristic control module 3'.

The characteristic indicator is configured to show simultaneously (i) specific information indicating specific characteristics of the respective control parameters obtained by the characteristic control module in the form of figures, numbers, or graphs (sensorially recognizable indication), and (ii) general information indicating general or overall characteristics of the same control parameters in the form of intuitively recognizable symbols such as language expressions, identifiable drawings or patterns, identifiable sounds or rhythms. Accordingly, laymen who do not have special knowledge can readily understand the characteristics of the control parameters and the characteristics of the object-to-be-controlled. Further, the user can learn the relationship between the control parameters and the characteristics outputted from the object.

In addition, the characteristic indicator is provided with an input device to which the user can directly input his or her evaluation of the control parameters in the process of adjusting the characteristics of the control parameters at the characteristics control module. Accordingly, the user can be involved in adjusting the characteristics of the control parameters.

In FIG. 1b, the base control module, the characteristic control module, and the characteristic indicator are integrated in the control unit. However, the embodiment is not limited thereto, and for example, the control unit can be separated along dotted line A and/or dotted line B in FIG. 1b.

Application to Combustion Engine

With reference to FIGS. 2 to 13, an apparatus for customizing overall characteristics that is applied for controlling a vehicle engine will be described.

Figure 2:
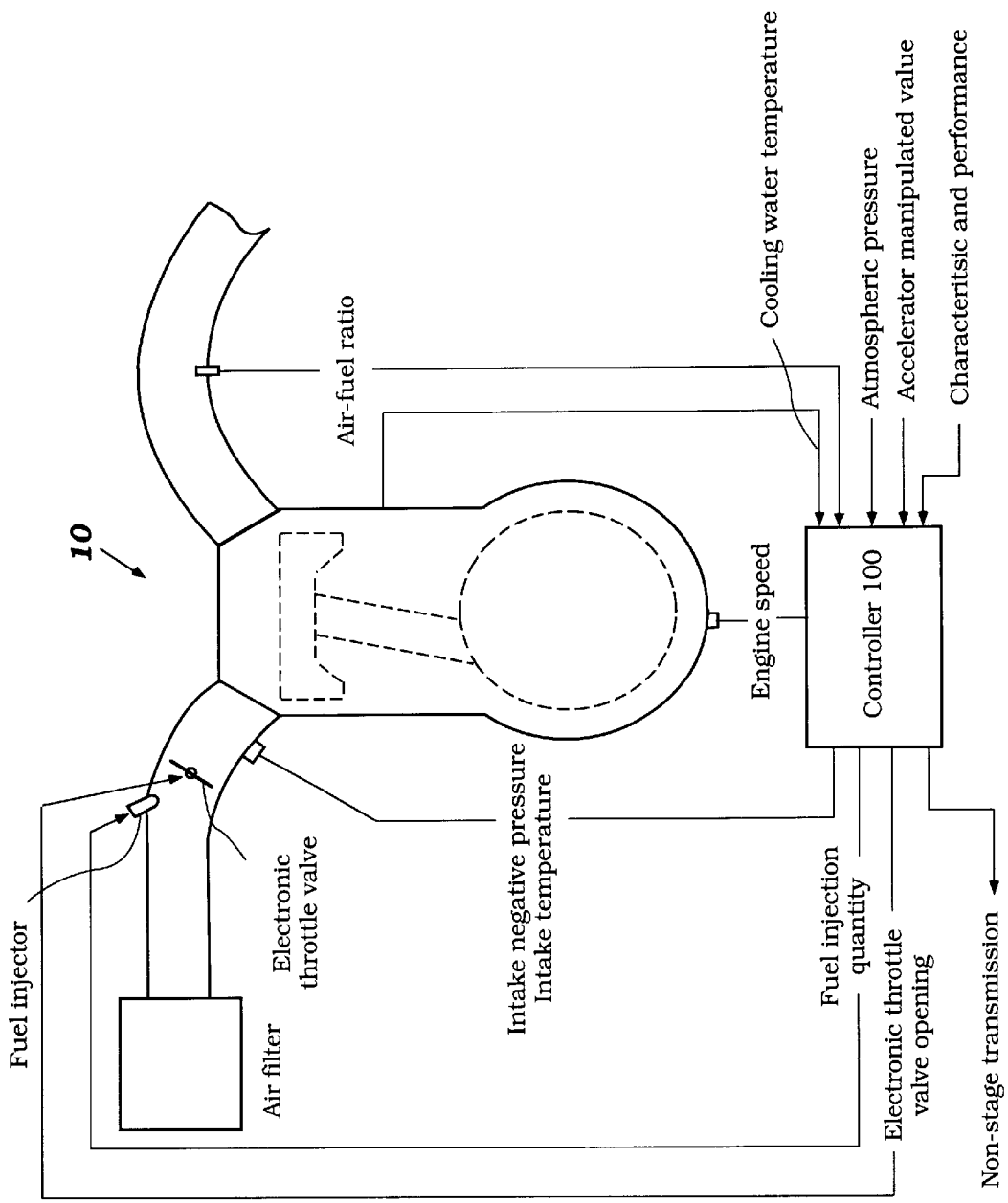
FIG. 2 is a schematic view showing a relationship between an internal combustion engine and a control device that defines an apparatus customizing overall characteristics.

FIG. 2 is a schematic view showing a relationship between an engine 10 and a control device 100 that defines an apparatus customizing overall characteristics.

The controller 100 is constructed so that fuel performance can be improved, obtaining desired drivability. Herein "driv- ability performance" means output performance of an engine in response to a throttle operation. As shown in the figure, the controller 100 receives as inputs information of engine speed, intake negative pressure, accelerator manipulated value, atmospheric pressure, intake temperature, and cooling water temperature. Based on the input information, it manipulates a fuel injector and an electronic throttle valve, and controls fuel injection quantity and intake atmosphere quantity, which leads to optimum control of drivability performance and fuel performance.

Figure 3:
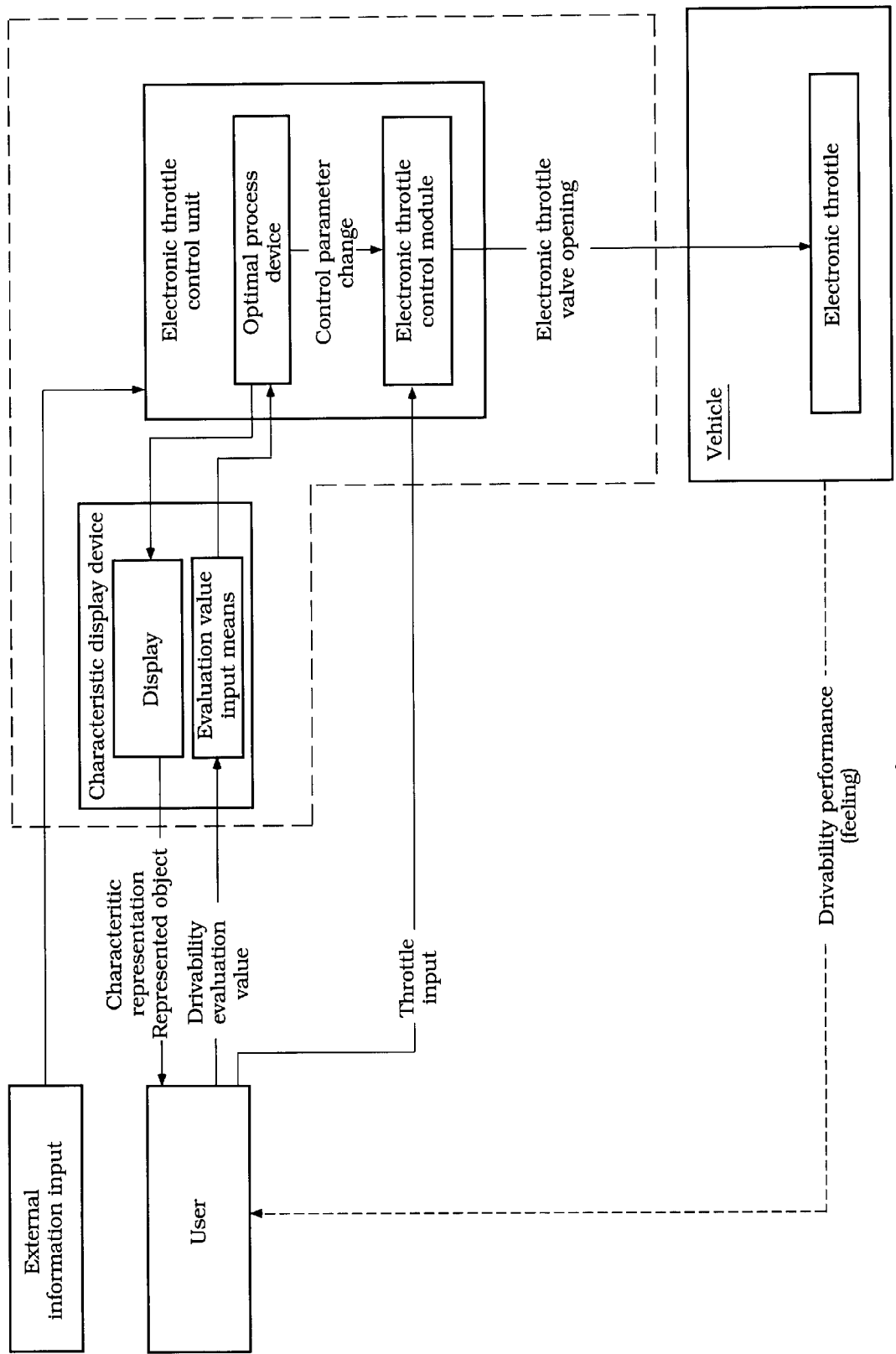
FIG. 3 is a block diagram of the control device.

FIG. 3 is a block diagram of the controller 100. As shown in the figure, the controller 100 comprises an electronic throttle control unit, a fuel injector control unit, and a characteristic display unit. The electronic throttle control unit includes an electronic throttle control module that determines an opening of an electronic throttle valve based on predetermined input information, and an optimal process device that customizes control parameters of the electronic throttle control module.

The fuel injector control unit includes a fuel injector control module that determines a basic fuel injection amount based on predetermined input information (an external information input in FIG. 3), a fuel injection amount compensation module that determines a compensation ratio to the basic fuel injection amount, an optimal process device that customizes the compensation module, and an evaluation device that evaluates the optimal process device.

Figure 4:
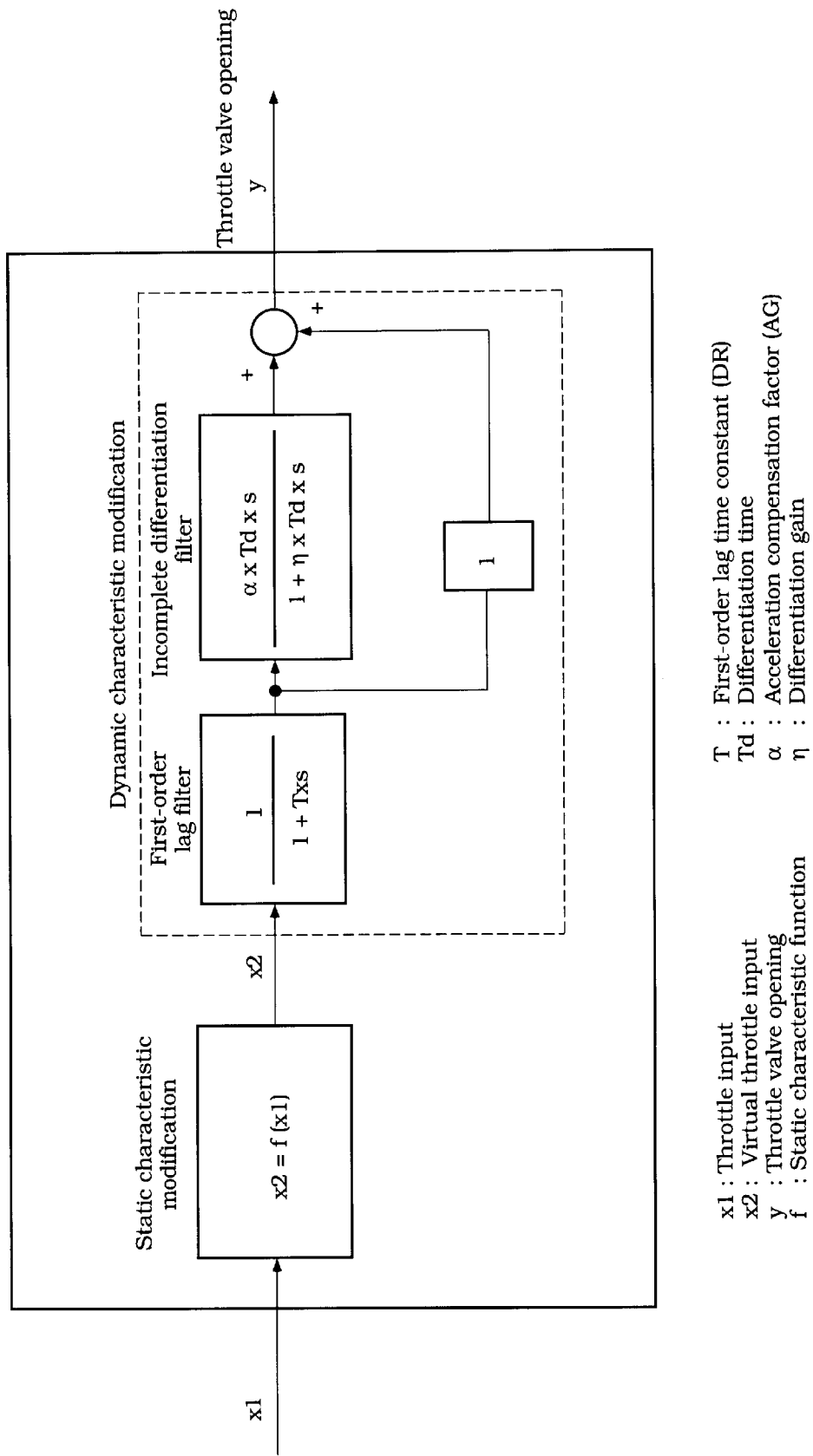
FIG. 4 is a block diagram of an electronic throttle control module.

FIG. 4 shows that the electronic throttle control module determines an opening of the electronic throttle valve based on an acceleration manipulated amount by a user. Herein the "acceleration manipulated amount" means information of both "an acceleration angle" and "an acceleration variable". The electronic throttle valve has two characteristics: static and dynamic. The former is the one derived from the relationship between the acceleration angle and the electronic throttle valve, which affects stationary running characteristics.

Figures 5A, 5B, 5C:
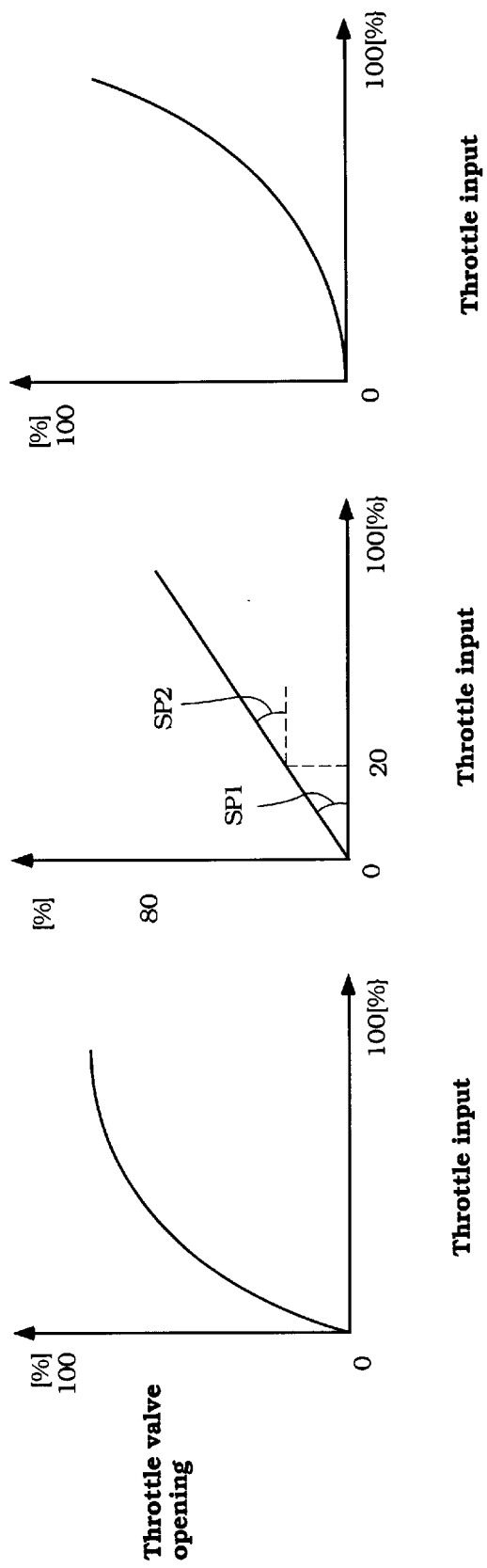
FIGS. 5a, 5b, and 5c are graphical views showing three exemplary static characteristics of throttle operational amounts versus throttle valve openings. The graph on the left-hand side shows the static characteristic that gives a quick acceleration at a relatively small opening. The graph at the middle position shows the static characteristic at a relatively small opening. The graph on the right hand side shows the static characteristic that gives a quick acceleration at a relatively large opening.

FIG. 5 is graphs illustrating static characteristics of some throttles, where the different static characteristics are shown. There are three types of static characteristics: a low-opening sudden-acceleration type which shows that the electronic throttle valve opens large when an acceleration angle is small, and it opens gradually to be fully open as the acceleration angle gets bigger; a high-opening sudden-acceleration type which shows that the electronic throttle valve opens gradually while the acceleration angle is small, and it opens suddenly to be fully open when the acceleration angle gets bigger; and a linear type which shows that the acceleration angle is proportional to the throttle opening. In this way, the same acceleration angle produces different throttle openings. These static characteristics should demonstrate that as the acceleration angle gets bigger, the throttle opening increases or is constant, which allows different kinds of functions. In the embodiment, the static characteristic is customized, by customizing throttle valve opening ratio SP1 when throttle opening is 0–20% and throttle valve opening ratio SP2 when throttle opening is 20–100%.

Figure 6:
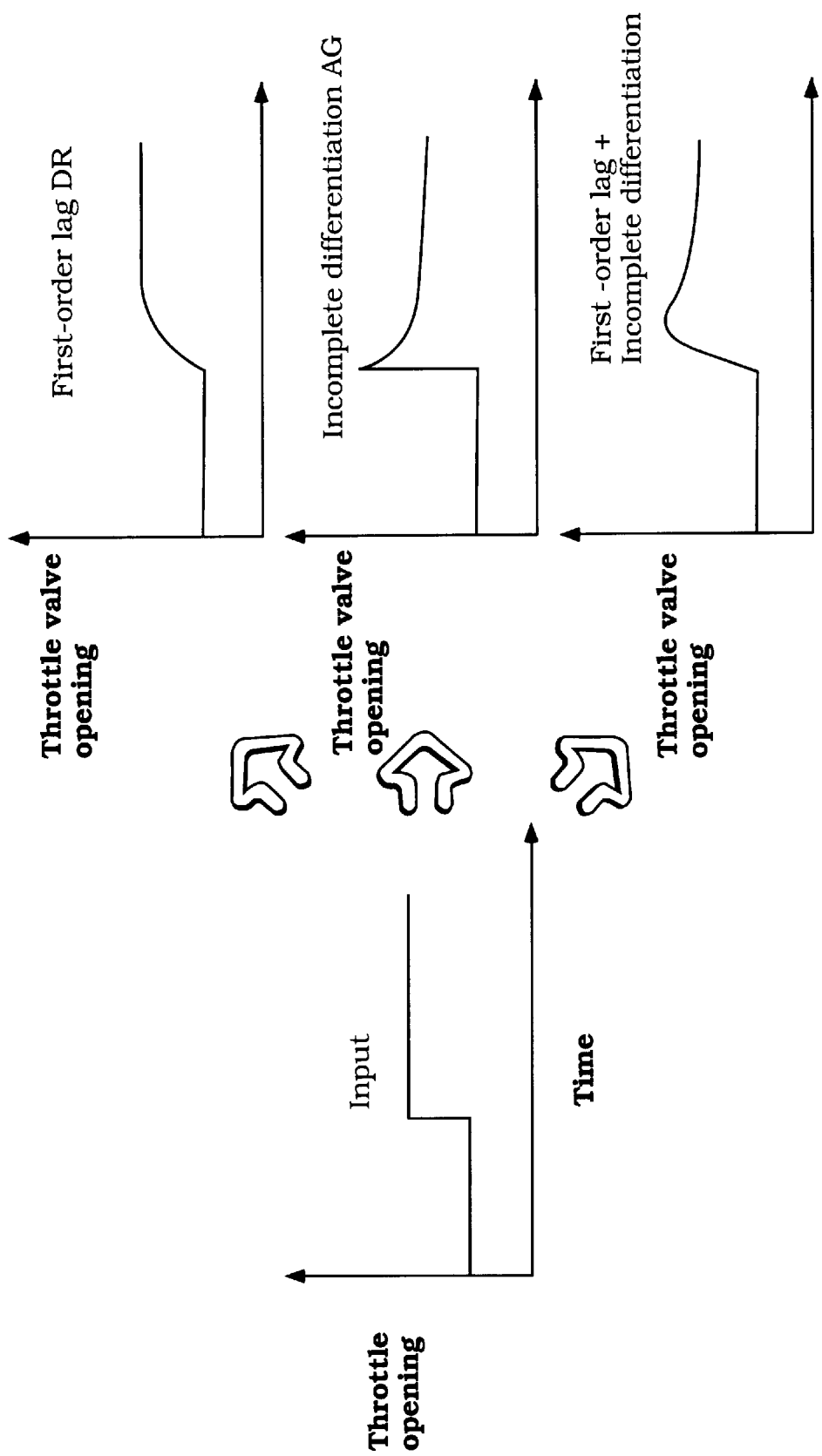
FIG. 6 is a graphical view showing some exemplary dynamic characteristics of throttle operational amounts versus throttle valve openings. The graph on the left-hand side shows an input form and three graphs on the right-hand side show output forms of the respective dynamic characteristics.

FIG. 6 shows a dynamic characteristic of some throttles. The latter of the electronic throttle valve characteristics, i.e., dynamic characteristic is the one derived from changed speeds of the throttle valve to changed speeds of the accelerator, which affects a transient characteristic of a vehicle. To be specific, the characteristic represents changed speeds of the throttle to changed speeds of the accelerator in a combination of first-order lag and incomplete differentiation. As shown in the figure, in a combination of first-order lag and incomplete differentiation, there are provided three types: the low-response type which shows that the throttle opens relatively slowly in response to acceleration manipulation; the high-response type which shows that although some spikes are produced in response to acceleration manipulation, the throttle responds fast and opens; and the type between the aforementioned two types. In this way, different types of dynamic characteristic are obtained. In the embodiment, the dynamic characteristic is customized by customizing first-order lag time constant DR and acceleration compensation factor AG.

Figure 7:
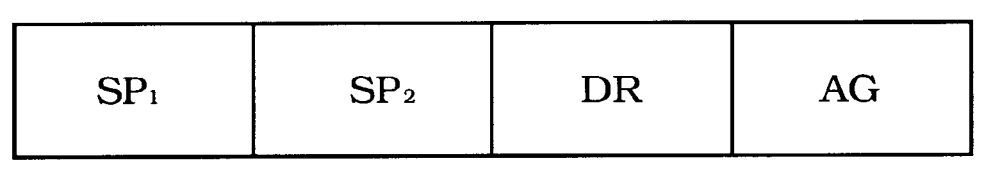

FIG. 7 shows coding of the control parameters of the electronic throttle control module. The optimal process device in the electronic throttle control unit employs, for example, a evolutionary calculation method, and codes as one individual the control parameters (throttle valve opening ratios SP1 and SP2, first-order lag time constant DR, and acceleration compensation factor AG) of the electronic throttle control module as shown in FIG. 7, which are to be customized using a evolutionary calculation method. Evaluation of the value of each control parameter during optimal process is conducted based on drivability performance a user feels in a real situation. As a result, each of the control parameters is customized according to the user's evaluation, which in turn produce the optimum characteristic of the electronic throttle (drivability characteristic) the user desires.

In this way, the method by which the user conducts the evaluation in optimum process is called interactive evaluation herein. In the embodiment, regarding as one individual a combination of a static characteristic and a dynamic characteristic, the entire combination is customized. However, there are other means described below.

1. An operator sets a static characteristic beforehand to customize a dynamic characteristic only.
2. A static characteristic and a dynamic characteristic are customized independently and individually.
3. A static characteristic is evolved first and then fixed; a dynamic characteristic is customized.

Customization processes in the above-described electronic throttle control section and the fuel injection device control section will now be described.

Figure 8:
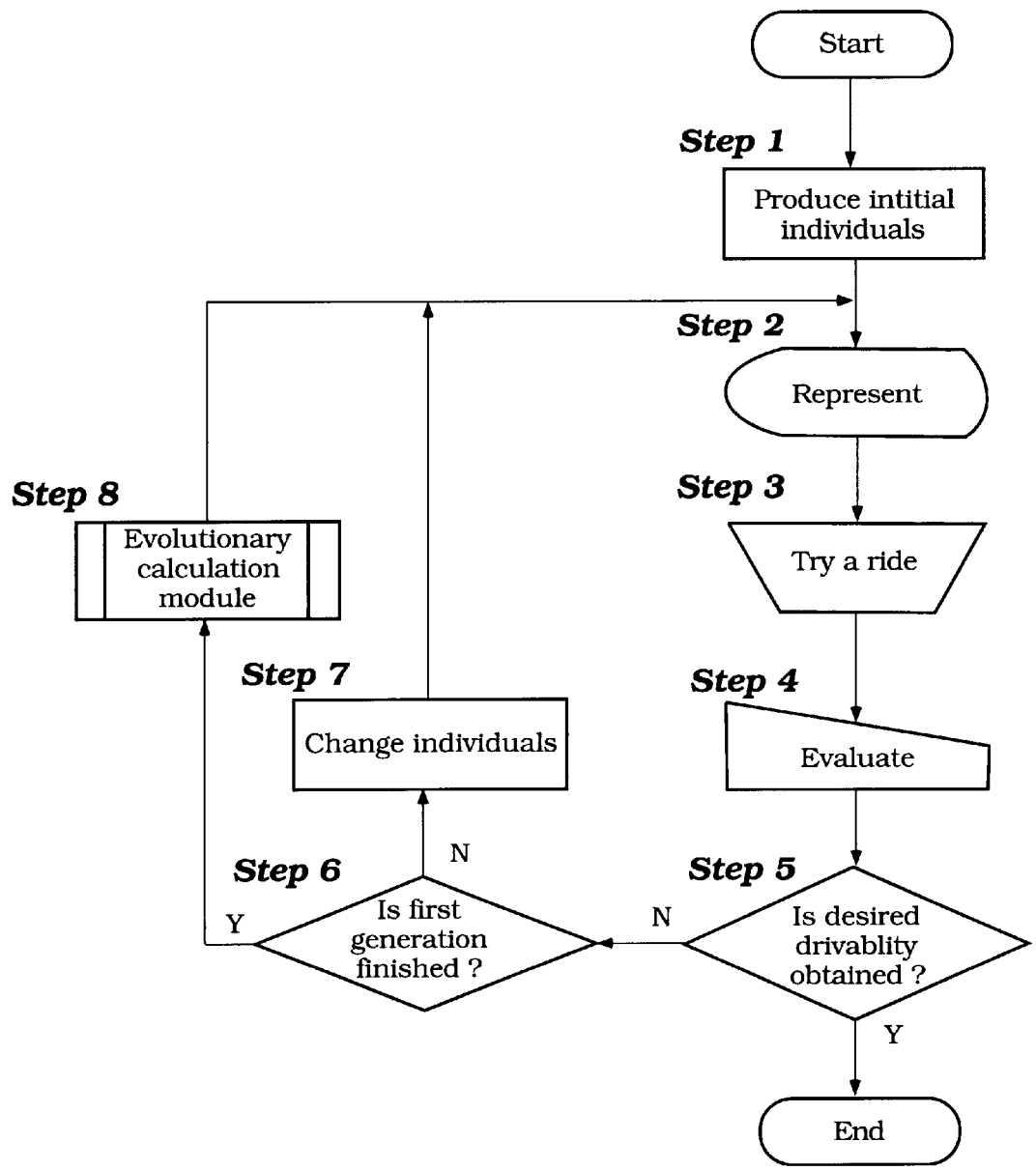
FIG. 8 is a sequential chart showing an entire routine for customizing of the control device.

FIG. 8 illustrates a sequential chart of an entire routine for customizing of the control device 100.

As seen in FIG. 8, at first and in step 1, the program determines at random initial values of control parameters (if in the electronic throttle control module, static characteristics SP1 and SP2, dynamic characteristics DR and AG, while if in the transmission ratio adjusting module, coupling coefficients of a neural network that forms the transmission ratio adjusting module) of the control module in the electronic throttle control section in a preset range. In this regard, the control parameters require customization. Then, a first generation formed with a plurality of initial individuals.

The program goes to step 2 and changes overall characteristics that are obtained by combining throttle characteristics based upon the respective parameters of individuals to fish patterns that imitate fishes that have similar characteristics and indicates the fish patterns on the characteristic display device as assistance information for evaluation.

Display Device Adapted for Engine

Figure 9:
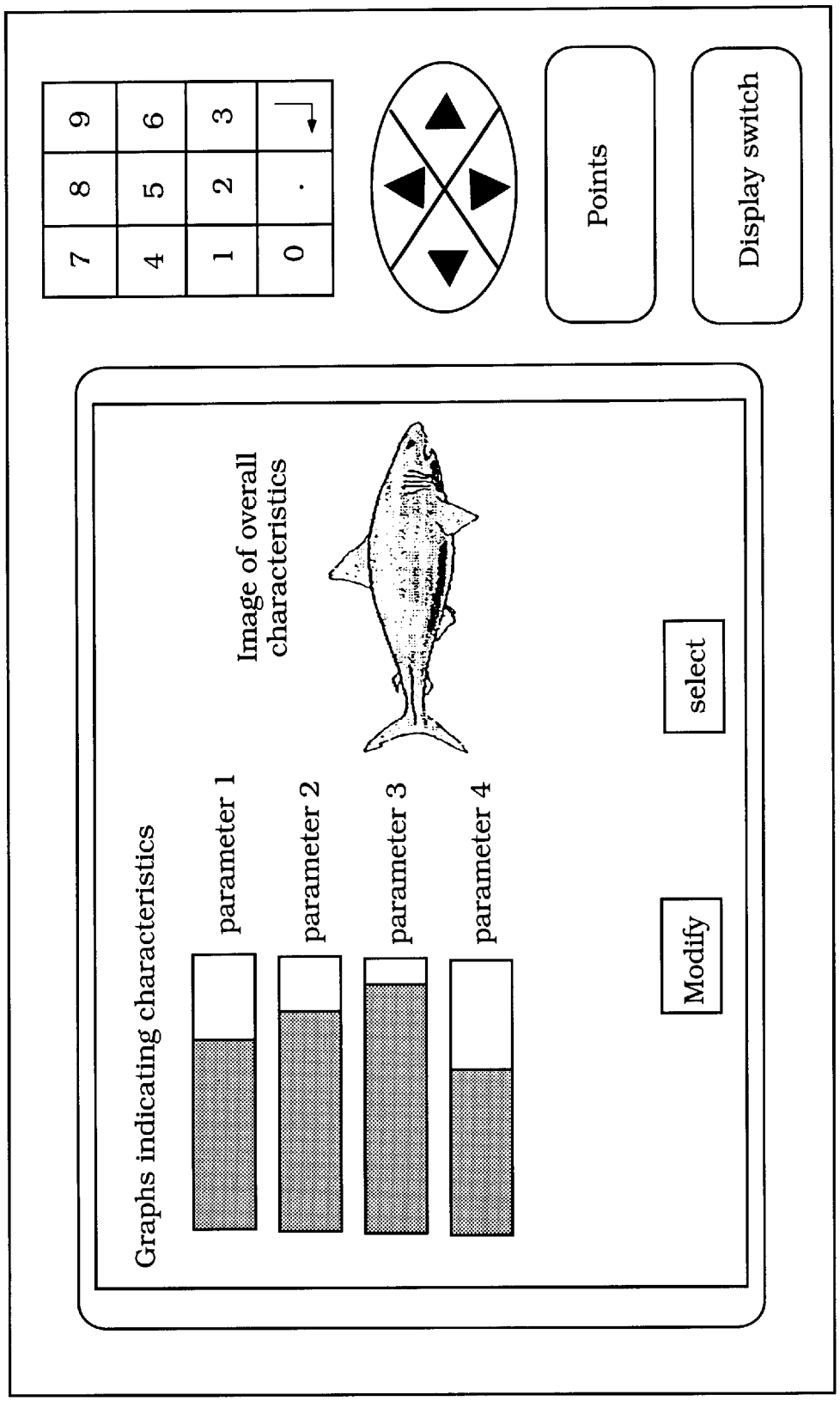
FIG. 9 is a schematic view showing a display of characteristics.

Before going to the following steps in the sequential routine, the characteristic display device will be described. FIG. 9 illustrates a schematic view of the characteristic display device. As seen in the figure, the display device includes a man-machine interface that comprises a display indicating the fish patterns and evaluation input elements operable by the user. The display device displays the overall characteristics, which are obtained by combining throttle characteristics based upon the respective individuals in the evolution processes, in the form of intuitively recognizable symbols or patterns by which the user can intuitively recognize the overall characteristics of the control parameters (in this embodiment, fish patterns that imitate fishes that have similar characteristics are selected) and in sensorially recognizable form by which the user can sensorially recognize the specific characteristics of the respective control parameters (in this embodiment, bar graphs). The above two levels of information allows the user not only to understand the relationship between the performance of the engine but also to learn manipulation techniques.

Specifically, the overall throttle characteristics will be obtained if the throttle characteristic vector s is given as $$s=[SP1\ SP2\ DR\ AG]^T$$

and through the following linear conversion;

$$As=f$$

In this regard, $$A = \begin{bmatrix} 1 & 0 & 0 & 0 \\ 0 & 1 & 0 & 0 \\ 0 & 0 & 1 & -1 \end{bmatrix}$$

As a result, the following overall throttle characteristics will be obtained;

$$f=[SP1\ SP2\ DR\text{-}AG]^T$$

Since the static characteristics SP1 and SP2 relate to a generous drive feeling, the combination of the static characteristics SP1 and SP2 are linked to species of fish. Meanwhile, since the dynamic characteristic DR-AG relates to responses, the dynamic characteristic DR-AG is linked to the shape of the fishes.

FIG. 10 illustrates specific fish patters in connection with the static characteristics. As seen in this figure, if both of SP1 and SP2 are large, a mere small throttle operational amount may make the throttle valve open completely. This characteristic is shown with a shark that is known as a fierce fish. If both of SP1 and SP2 are small, the throttle valve can slightly open even though the throttle operational amount is fully given. This characteristic is linked to a blowfish that is known as a tranquil fish.

Figure 11:
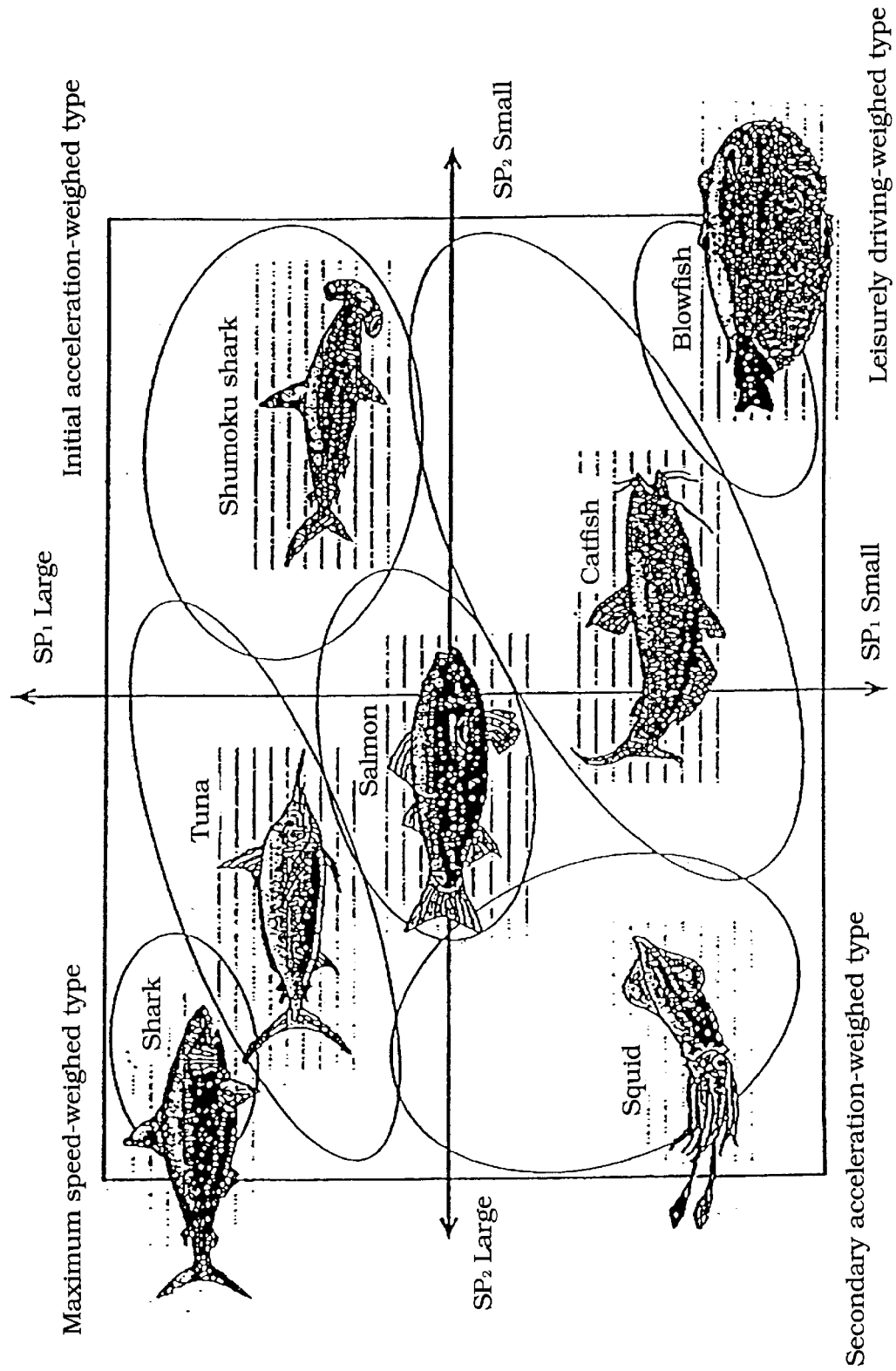
FIG. 11 is a schematic view showing an exemplary two-dimensional map formed with the static characteristics (SP1 and SP2) in which the corresponding fish patterns are indicated.

FIG. 11 illustrates an image map in which fish patterns are linked to and shown in a two-dimensional space that is constructed with SP1 and SP2.

Figure 12:
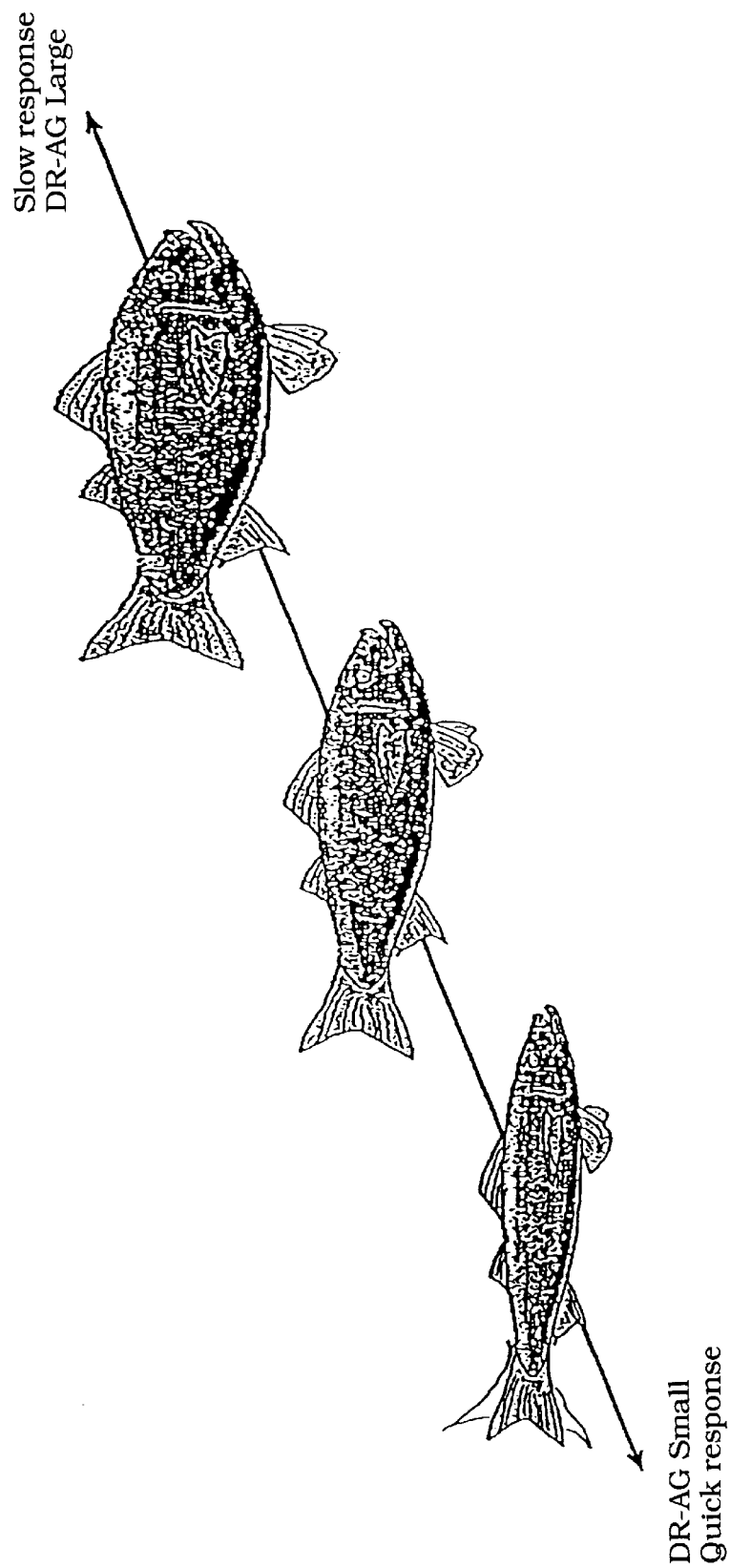
FIG. 12 is a schematic view showing an exemplary map formed with the dynamic characteristics (DR-AG) in which the corresponding fish patterns are indicated.

Also, FIG. 12 illustrates linkages between the dynamic characteristics and body forms of fishes because responses vary with changes of DR-AG. That is, the smaller the DR-AG is, the sharper the response is. If the DR-AG is small, a slender figure is shown so that the user can intuitively recognize the linkage. If the DR-AG is large, a fat figure is given to the user so that he or she can intuitively have an impression of slowness.

Returning back to FIG. 8, the customization process of the electronic throttle control section will be described.

After showing the fish patterns in the characteristic display device at step 2, the program expects that the user has a test ride by using one or some individuals of the first generation at step 3. The user, hence, makes the test ride and inputs his or her evaluation upon the individuals at step 4. As described above, the characteristics obtained from the respective individuals in the evolutionary processes are shown in the characteristic display device by using the fish patterns linked to the throttle characteristics. Accordingly, the user can input his or her evaluation values on the respective individuals based upon his or her bodily sensation with reference to the fish patterns shown in the display device by the input elements, i.e., buttons that are positioned at right-hand side of the display screen in this embodiment.

Specifically, the evaluation values can be determined in proportion to the period of time in which the user continuously pushes the bottom. The evaluation value will be, for example, calculated by multiplying a preset coefficient to the reciprocal number of the time period or by employing fuzzy rules. Thereby, even if the evaluation by the user has fuzziness, the evaluation values can have certain accuracy and allows the user to apply the evolutionary method in such a dialog style. In addition, if the user continuously pushes the button beyond a preset time, the program can skip the individual under evaluation to the next individual at the moment. Thereby, the user can immediately discard the undesirable individual and the evolution can be expedited. The individuals are preferably exchanged when the vehicle is at a standstill to avoid influences due to abrupt changes of the throttle characteristics under running conditions.

Next, the program goes to step 5 to determine if the vehicle has obtained a desirable drivability or acceleration performance. If this is positive, the program finishes the sequential routine. If this is negative, the program goes to step 6 to determine whether the test ride and evaluation have been completed through the entire individuals of the generation. If this is denied, the program goes to step 7 to exchange the parameters of the individual to parameters of another individual in the control module and repeat another test ride at step 3 and also another evaluation at step 4. If all of the test rides and evaluations upon the entire individuals are finished, the program goes to step 8 to transfer to an evolution-type calculation module and then produce individuals of the next generation. Then, the parameters of these individuals will be employed for further test rides and evaluations.

The processes are repeated until a desirable drivability or acceleration performance is obtained. As a result, the parameters of the electronic throttle control module and the transmission adjustment ratio module can be customized.

The evolution-type calculation module that is employed for the respective customization processes will be described by citing a genetic algorithm as an instance.

Figure 13:
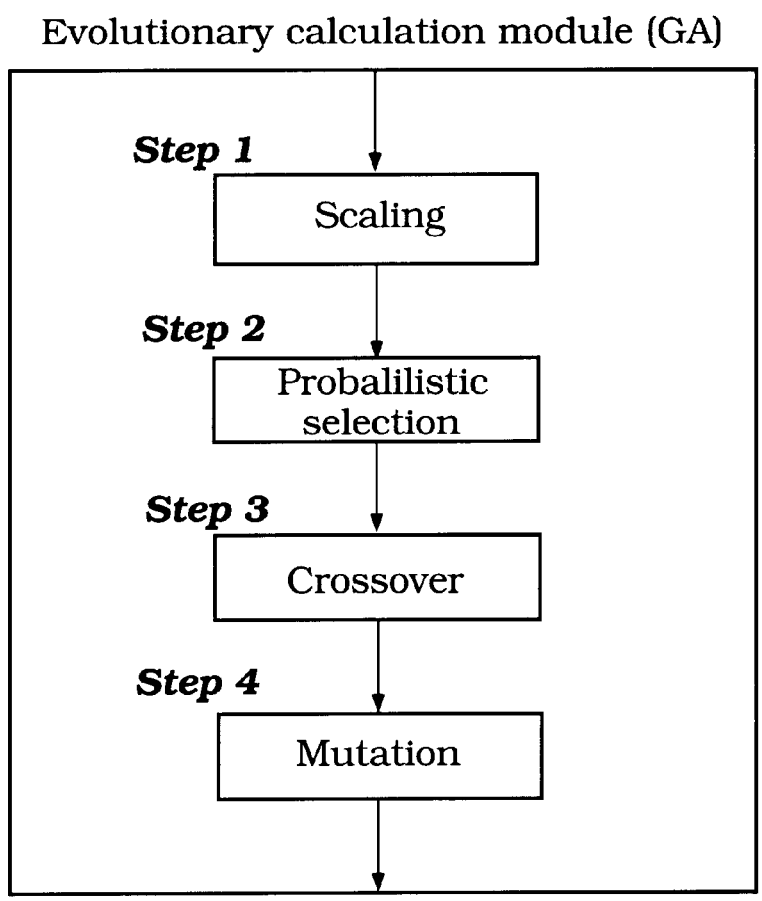
FIG. 13 is a sequential chart showing an evolution-type calculation module that uses a genetic algorithm as an evolution-type calculation method.

FIG. 13 is a flowchart illustrating an evolutionary calculation module that uses a hereditary algorithm as a evolutionary calculation method. After completing evaluation of all the individuals of the first generation, the module produces a group of individuals for a next generation when the desired characteristic is not obtained.

With regard to scaling (step 1), linear transformation of adaptability is performed so that the ratio of maximum adaptability to average adaptability in an individual group can be constant.

With regard to selecting (step 2), a roulette selecting system may be employed that selects probabilistically proportional to the user's evaluation value (adaptability). a tournament selecting system may also be used which selects the individual with the best evaluation value among n randomly selected individuals.

With regard to crossing over (step 3), there are systems which use one point crossing over, two point crossing over, and normal distribution crossing over. A selected crossing-over parent happens to be the same individual, but if this situation is left, versatility as an individual group will be lost. On the ground of this, when a parent selected at crossing over is the same individual, another selected individual should be replaced to avoid the crossing over of the same individual as much as possible.

With regard to mutating (step 4), value of each gene of individuals is changed randomly at a predetermined probability. There is another method which adds perturbation following a normal distribution. In spite of the fact that different individuals are selected as crossing-over parents, when they are quite the same in terms of heredity, mutation for both of the crossing-over parents is produced with a higher probability than usual.

Other than the methods mentioned above, there can be employed a generation change method called "regeneration" that replaces all the individuals of one generation at one time. When strictly applying to generation change, there is a possibility that a individual with high evaluation will be destroyed. Therefore, the strategy should be used that the elite (individuals with high evaluation) are left unconditionally to a next generation, or the elite are preserved.

Other Applications

As described above, in the illustrated embodiments, the characteristics of control parameters that are evaluated by a user are shown to the user in two forms of information on a characteristic display device in the customization process of throttle characteristics of an electronic throttle. The first form is an intuitively recognizable symbol for general or overall characteristics, such as fish patterns that can be identified by the user as the symbol has similar overall dispositions. The second form of information is a sensorially recognizable form for specific characteristics, such as bar graphs that show the characteristics of the respective control parameters. The user, with the first form of information, can intuitively recognize the relationships between the indications and the characteristics. Therefore, by watching the indications, they can easily evaluate the characteristics that are hardly distinguished only by his or her bodily sensation. Further, with the second form of information, the user can obtain more detailed information on the control parameters, and the user can learn the relationship between the first form and the second form and between the second form and the performance of the engine. These two forms of information allow the user to learn manipulation techniques, leading to easy and quick but sophisticated customization of the control module. No special knowledge or skills are not required. This method may eliminate the user's burden to read through an operating manual or instruction book to understand the relationships between the characteristics and the indications. In addition, the method reduces the possibility that the evolution goes to an undesirable direction due to the user's misunderstanding in the evolutionary processes.

In the above, if the user leans the relationship between the first form of information and the performance of the engine, the first form of information may not be required. That is, after the user masters manipulation techniques of the second form of information, the first form of information can be removed from the display. This can be accomplished automatically or manually. After the passage of a certain period of time, the first form of information can automatically disappear from the display. Alternatively, based on key operation, the skills of the user can be determined, and after reaching a certain threshold, the first form of information can automatically disappear from the display. The above can be controlled manually by pushing a button.

Preferably, the characteristic display device is so disposed that the user can watch it when running the vehicle. If disposed like this, the display may be constructed to provide both of the above-noted indications and other indication of information such as a vehicle speed or engine speed on the same screen by switching over them or simultaneously.

In the illustrated embodiment, characteristics of respective individuals and a characteristic of the individual that is used for a test ride are shown in the characteristic display device after the individuals are produced and before the test ride. However, the display is not necessarily given at this moment. Any timing such as after the test ride can be also practicable.

Furthermore, in the illustrated embodiment, the characteristic display device shows the static characteristics with species of fishes and the dynamic characteristics with body forms of the fishes. However, it is also applicable to show respective characteristics of multiple control modules in combination. That is, for example, additionally showing characteristics of the fuel efficiency with lengths (or sizes) of the fishes if necessary is a good idea.

Moreover, the overall characteristic control method and apparatus in the illustrated embodiment is employed for the electronic throttle control. However, the method and apparatus are applicable for any machines if they are controlled by control devices that have control parameters which characteristics are changeable. For instance, a sugar degree measurement device (a device for measuring sweetness of food) may employ the method and apparatus. The device can change parameters such as, for example, "tasty" and "not so tasty" that come from, for example, sweetness of fruit or its pH to something that the user may identify similarities to them, for example, indications that have human faces and present them as assistance information in a display. Thereby, the user can determine whether the food that he or her tries to eat is tasty or not tasty before actually eating them. Otherwise, the user may consult it in his or her determination of the food taste after eating. For instance, the user's evaluation after eating a fruit can help the sugar degree measurement device rectify the indication map (e.g., human faces) so that the user can evaluate the taste more correctly.

Still further, it is applicable to provide a unit that unifies the characteristic display device and the customization process section and then make the unit detachable from the vehicle. Since the user can intuitively recognize the relationships between the characteristics and the indications on the display. he or she can customize the control parameters or simulate it in a certain direction of the customization at his or her home without actually riding the vehicle. The customization without rides on the vehicle not only expedites the customization per se but also make it possible that the user can previously obtain characteristics that are suitable for weather or environment when and where he or she plans to go at home by using the overall characteristic customization device. This is, in other words, to give a pleasure to the user that is a kind of amusement of breeding the vehicle or machine.

The intuitively recognizable symbol can be organisms such as, for example, plants, fishes, birds, mammals or reptiles and even inorganic things such as, for example, rocks or buildings.

Additionally, in the present invention, correlations between various inputs and various outputs of the control modules can be determined using existing techniques such as neural networks, fuzzy neural networks, and genetic algorithms if the correlations are highly complex, or using existing techniques such as maps and functional equations if the correlations are rather simple. In this regard, Da Ruan (editor)"Intelligent Hybrid Systems—Fuzzy Logic, Neural Networks, and Genetic Algorithms—" Kluwer Academic Publishers (1997), J.-S. R. Jang, C.-T. Sun, E. Mizutani, "Neuro-Fuzzy and Soft Computing" Prentice Hall Upper Saddle River, N.J. 07458 (1997), C.-T. Lin and C. S. George Lee, "Neural Fuzzy Systems" Prentice Hall Upper Saddle River, N.J. 07458 (1998), and N. K. Kasabov, "Foundations of Neural Networks, Fuzzy Systems, and Knowledge Engineering" the MIT Press (1996) are hereby incorporated by reference. The above techniques can be combined, and learning control can be adapted for any techniques.

Further, in addition to genetic algorithms (GA), genetic programming (GP) or other evolutionary computing techniques can be adapted to the present invention (Wolfgang Banzhaf, et al. (editor), "Genetic Programming, An Introduction", pp. 363–377, 1999, Morgan Kaufmann Publishers, Inc., for example). These techniques are sometimes categorized as "heuristic control" which includes evolution, neighborhood searching, mountain crumbing, simulated annealing, tab search, and reinforcement learning method (S. Suzuki, et al., "Vision-Based Learning for Real Robot: Towards RoboCup", RoboCup—97 Workshop, 23, 24, and 29 August, 1997 Nagoya Congress Center, pp. 107–110; K. and Nurmela, et al., "Constructing Covering Designs By Simulated Annealing", pp. 4–7, Helsinki University of Technology, Digital Systems Laboratory, Technical Reports No. 10, January 1993, for example). These techniques can be adapted to the present invention without complication, based on the principle described earlier; that is, in the present invention, "evolutionary computing" includes the above various techniques.

Of course, the foregoing description is that of preferred embodiments of the invention, and various changes and modifications may be made without departing from the spirit and scope of the invention, as defined by the appended claims.

What is claimed is:

1. A method for controlling a machine operated by a user using a control module, the input-output relationship of said control module being regulated by pre-selected control parameters, said method comprising the steps of: (a) calculating values of the control parameters; (b) operating the machine using the values of the control parameters; (c) indicating to the user the values of the control parameters in sensorially recognizable form; (d) indicating to the user an intuitively recognizable symbol generalizing the values of the control parameters; (e) selecting or modifying the values of the control parameters by the user using the information indicated in steps (c) and (d) based on the user's evaluation of the performance of the machine, thereby modifying the input-output relationship of said control module; and (f) repeating steps (a) through (e) while operating the machine to customize the input-output relationship of said control module.

2. The method according to claim 1, wherein step (a) is conducted using evolutionary computing techniques.

3. The method according to claim 1, wherein step (c) indicates the value of each control parameter in sensorially recognizable form.

4. The method according to claim 1, wherein step (d) indicates one intuitively recognizable symbol generalizing the values of all of the control parameters.

5. The method according to claim 1, further comprising, after step (f), repeating steps (a), (b), (c), and (e).

6. The method according to claim 1, wherein the machine is a motor.

7. The method according to claim 6, wherein the control parameters are a static characteristic and a dynamic characteristic of the motor.

8. The method according to claim 1, wherein the selected values of the control parameters are saved in a detachable memory.

9. An apparatus for controlling a machine operated by a user comprising: (a) a control module for controlling performance of the machine, the input-output relationship of said control module being regulated by pre-selected control parameters; (b) a parameter module for calculating values of the control parameters; (c) an indicator for indicating to the user (i) the values of the control parameters in sensorially recognizable form and (ii) an intuitively recognizable symbol generalizing the values of the control parameters; and (d) an input device for selecting or modifying the values of the control parameters by the user using the information indicated in the indicator, thereby modifying the input-output relationship of said control module.

10. The apparatus according to claim 9, wherein the parameter module comprises an optimizer configured to optimize values of the control parameters using evolutionary computing techniques based on information from the input device.

11. The apparatus according to claim 9, wherein the indicator indicates visual patterns.

12. The apparatus according to claim 9, wherein the machine is a motor.

13. The apparatus according to claim 9, wherein the control module controls the machine by outputting a controlled variable based on input information which includes at least one of a manipulated variable inputted from the user, environmental information, or information indicative of the performance of the machine.

14. The apparatus according to claim 9, wherein the sensorially recognizable form is in the form of figures, numbers, or graphs.

15. The apparatus according to claim 9, wherein the intuitively recognizable symbol is in the form of language expressions, identifiable drawings or patterns, or identifiable sounds or rhythms.

16. The method according to claim 1, wherein in step (a), values of the control parameters is calculated by heuristic processing.

17. The method according to claim 16, wherein the heuristic processing is evolutionary computing.

18. The method according to claim 17, wherein the evolutionary computing is genetic algorithms or genetic programming.

* * * * *

UNITED STATES PATENT AND TRADEMARK OFFICE
CERTIFICATE OF CORRECTION

PATENT NO. : 6,941,176 B2
DATED : September 6, 2005
INVENTOR(S) : Ichikai Kamihira et al.

It is certified that error appears in the above-identified patent and that said Letters Patent is hereby corrected as shown below:

<u>Title page,</u>
Item [56], References Cited, FOREIGN PATENT DOCUMENTS, below
"0 715 253 A2," insert -- EP    0 496 570 A2    7/1992 --.
OTHER PUBLICATIONS,
"Q. H. Wu, et al.," reference, delete "pp" and insert -- pp. --;
"P.K. Dash, et al.," reference, delete "pp"and insert -- pp. --.

Signed and Sealed this

Eleventh Day of April, 2006

JON W. DUDAS
*Director of the United States Patent and Trademark Office*